United States Patent Office 3,106,592
Patented Oct. 8, 1963

3,106,592
PURIFICATION OF FLUID STREAMS
Paul E. Toren, Bartlesville, Okla., assignor to Phillips Petroleum Company, a corporation of Delaware
Filed July 8, 1957, Ser. No. 670,423
6 Claims. (Cl. 260—677)

This invention relates to an improved method and means for removing impurities in a fluid stream within predetermined limits. In one aspect, this invention relates to the determination of small amounts of carbon dioxide present in a fluid stream. In one of its more specific aspects, it relates to an improved method and means for removing carbon dioxide from a hydrocarbon stream and determining residual carbon dioxide remaining in the hydrocarbon stream within close limits. In another of its more specific aspects, it relates to a method for providing a substantially carbon dioxide-free olefin stream suitable for polymerization in the presence of a catalyst which is sensitive to carbon dioxide.

In the catalytic polymerization of olefins to form high molecular weight solid polymers, it has been found necessary to provide an olefin feed to the process containing controlled amounts of impurities such as carbon monoxide, carbon dioxide, oxygen, water and acetylene in order to obtain a desired degree of polymerization and to maintain the useful life of the catalyst within reasonable limits. It has been determined that in some polymerization processes, catalysts are extremely sensitive to carbon dioxide and it is deemed necessary to maintain the carbon dioxide content of the olefin feed to the polymerization process below a certain critical maximum value. The removal of carbon monoxide, acetylene, oxygen, and water can be satisfactorily accomplished and the residual impurities determined with satisfactory accuracy; however, the determination of small amounts of carbon dioxide has been found to be more difficult to obtain by continuous analysis within the desired range of accuracy and precision.

A method for the purification of an olefin stream for catalytic polymerization and a method for the catalytic polymerization of olefins are described in copending application Serial No. 584,776, filed May 14, 1956, now U.S. Patent No. 2,910,461, by H. D. Lyons and G. Nowlin. The present invention is applicable to the process described in the copending application and provides an improved method of carrying out the described process.

It is an object of this invention to provide an improved method for supplying a substantially carbon dioxide-free fluid stream. Another object of this invention is the provision of a method and means for continuously determining the carbon dioxide content of an olefin stream comprising the feed to a polymerization process. Still another object of the invention is the provision of a method and means for determining the carbon dioxide content of the effluent of a carbon dioxide removal step, recovering "on specification" olefins from said removal step, and rejecting "off-specification" olefin effluent from said removal step. Other objects and advantages will be apparent to one skilled in the art upon study of the disclosure of this invention including the drawing wherein:

Figure 1:
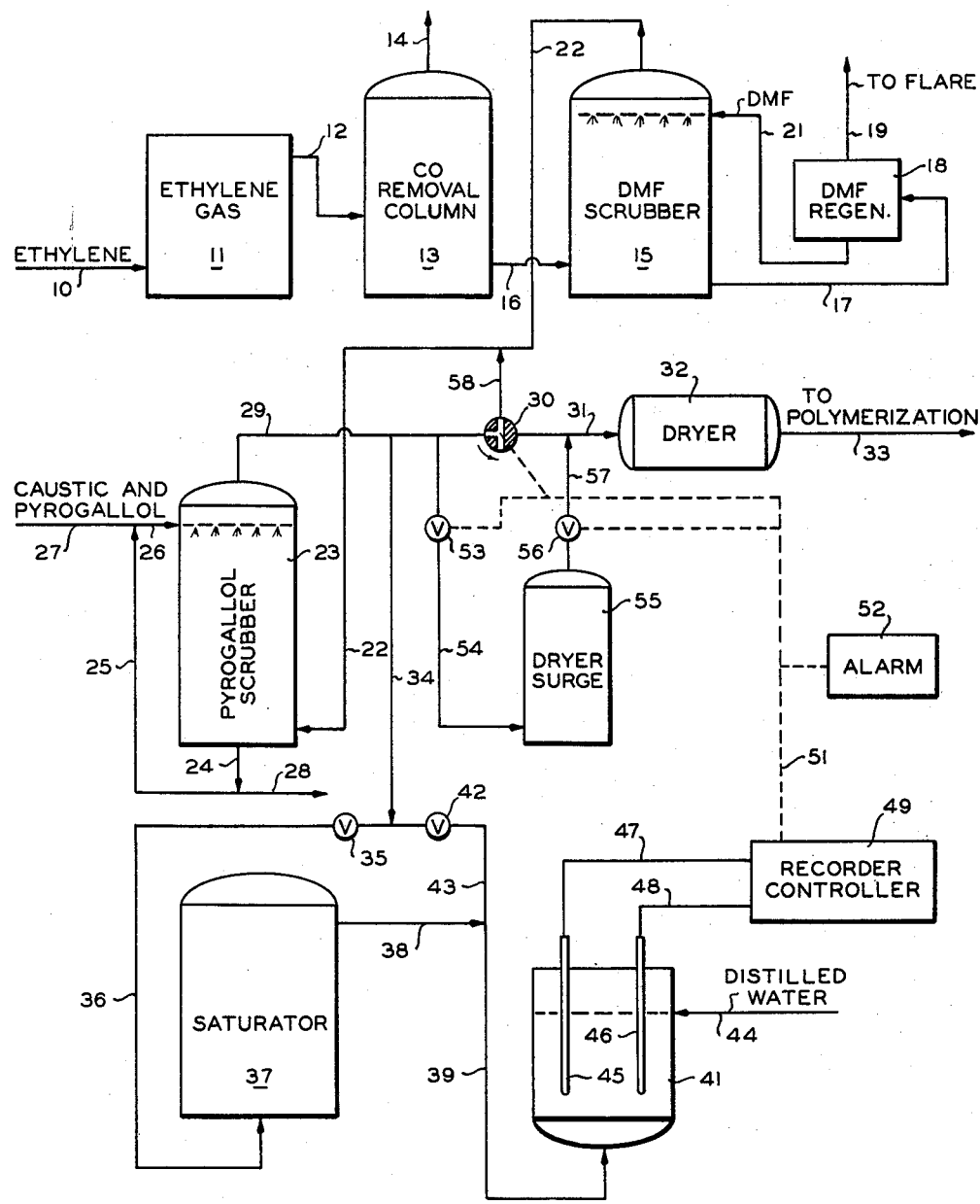
FIGURE 1 is a schematic flow sheet illustrating one embodiment of the invention.

Broadly, the invention contemplates the continuous determination of small amounts of carbon dioxide in the effluent of a carbon dioxide removal process by continuously bubbling a sample of the effluent stream, as a gas, through a saturated solution of alkaline earth carbonate which contains a solid alkaline earth carbonate phase, and determining the carbon dioxide content of the sample as a function of the pH of the solution containing dissolved carbonates, carbon dioxide and solid carbonates and controlling the carbon dioxide removal process in response to the carbon dioxide content of the sample. The pH is determined with a glass electrode-calomel electrode system. Several equilibria exist in such a cell. (1) Calcium carbonate is continuously being dissolved and precipitated; (2) the dissolved calcium carbonate is continuously forming calcium and carbonate ions; (3) calcium and carbonate ions are continuously combining to form calcium carbonate; (4) water is continuously forming hydroxyl ions and hydrogen ions which are continuously recombining to form water; (5) some of the hydrogen ions plus carbonate ions are forming carbonic acid which in turn yields bicarbonate and hydrogen ions; (6) the carbon dioxide in the gas is being dissolved in and vaporized from the water; (7) the dissolved carbon dioxide is combining with water to form additional carbonic acid; (8) calcium ions are combining with hydroxyl ions to form calcium hydroxide; (9) calcium hydroxide is reacting with carbonic acid to form calcium bicarbonate and water. These equilibria can be represented by the following equations:

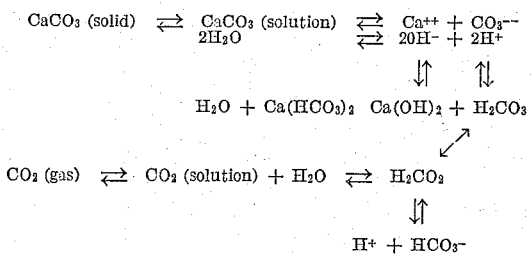

When the carbon dioxide content of the gas passing through the pH cell is below the pressure of the dissolved carbon dioxide, the gas will remove carbon dioxide from the cell which will remove hydrogen ions from solution to replace the carbonic acid decomposed. The result is an increase in pH of the solution. On the other hand, if the partial pressure of the carbon dioxide in the gas being analyzed exceeds the partial pressure of carbon dioxide in the equilibrium cell, decreased pH is indicated because the hydrogen ion concentration increases as a result of increased carbonic acid concentration which pushes the decomposition or ionization reaction to form more hydrogen ions and bicarbonate ions. Since the latter ions combine with calcium to form calcium bicarbonate, an increase in the hydrogen ion concentration is accomplished because the hydroxyl ions with which the hydrogen ions would normally react to form water have been removed in the form of calcium hydroxide.

The carbon dioxide indicator of this invention is insensitive to small amounts of acidic or basic materials and is therefore specific to the determination of $CO_2$. The equilibrium cell can determine 1 to 10 p.p.m. $CO_2$ to 1 p.p.m. and can determine 50 to 500 p.p.m. to 10 p.p.m. providing the pH meter can be read to 0.04 unit. Thus the accuracy of the cell is usually greater than the precision of the pH measurement. As a result of a slurry being used in the cell it is not necessary to use a fritted glass disc in the cell to break up the gas stream and obtain intimate mixing of gas and liquid but instead a a pierced disc can be used to support the solids. The holes in the disc can be 0.2 to 1 millimeter in diameter. The back pressure is thus greatly reduced. The presence of the solids in the cell results in improved distribution of the gass in the liquid in the cell.

In accordance with the present invention means are provided to hold the carbon dioxide content of the carbon dioxide removal step effluent below a maximum value as it passes to the drier step. This is accomplished by providing a surge tank to the drier which automatically fills with "on specification" wet product gas during periods of satisfactory operation and which provides feed for the drier during periods of "off-specification" operation so that "off-specification" pyrogallol scrubber effluent can be automatically recycled to the scrubber until the carbon dioxide content is again "on specification."

The invention will now be described with reference to FIGURE 1 of the drawing and as a specific embodiment of the invention, the process will be described as directed to the purification of an ethylene stream to be used in a process for the polymerization of ethylene to produce solid polyethylene, and the alkaline earth carbonate used in determining the carbon dioxide content of the carbon dioxide scrubber effluent stream in the described process will be calcium carbonate. Various valves, controls, motors, pumps, and the like which are necessary in the operation of the process but whose use will be obvious to one skilled in the art are omitted from FIGURE 1 and will not be referred to in the discussion.

The ethylene is received from the source (not shown) via conduit 10 and is stored in gas holder 11 from whence it passes via conduit 12 to carbon monoxide removal column 13. A portion of the methane content, substantially all of the carbon monoxide and a small portion of the ethylene are taken overhead from column 13 via conduit 14 and removed from the system. The carbon monoxide-free ethylene is then passed to the acetylene removing scrubber 15 via conduit 16 and is contacted with dimethylformamide (DMF), a selective solvent for acetylene. Substantially all of the acetylene and a small portion of the ethylene are absorbed by the DMF and are removed from the bottom of the scrubber via conduit 17 and passed to a DMF regeneration zone 18 wherein the stream is flashed and stripped to remove acetylene and other volatile materials and to regenerate the DMF suitable for recycle to the scrubber. The volatile materials are removed via conduit 19 and the regenerated DMF is returned to scrubber 15 via conduit 21. Substantially acetylene-free ethylene is removed from scrubber 15 via conduit 22 and is passed to pyrogallol scrubber 23 and contacted therein with a solution of pyrogallol in sodium hydroxide whereby both oxygen and carbon dioxide are substantially completely removed.

Pyrogallol-sodium hydroxide solution is removed from scrubber 23 via conduit 24 and is recycled via conduit 25 and conduit 26 to the scrubber. Fresh sodium hydroxide and pyrogallol solution are continuously added via conduit 27 to maintain the strength of the scrubbing liquid at the desired level and a corresponding amount of depleted solution is continuously removed via conduit 28. Substantially oxygen-free and carbon dioxide-free ethylene is removed from scrubber 23 via conduit 29 and is passed through three-way valve 30 (shown in closed system position) and conduit 31 to drier 32. Moisture is substantially completely removed from the substantially pure ethylene in drier 32, for example by being adsorbed on alumina. The effluent from drier 32 is passed via conduit 33 to the polymerization process (not shown). Drier 32 can conveniently comprise two vessels connected in parallel relationship so that one vessel can be regenerated while the other vessel is being used.

A sample stream of the effluent of scrubber 23 is taken from conduit 29 via conduit 34 through valve 35 and conduit 36 to saturator 37 where the gas is contacted with water to provide a water saturated gas which passes via conduit 38 and conduit 39 to pH cell 41 which, in its simplest form, comprises a slurry of finely divided calcium carbonate in distilled water. Instead of presaturating the gas with water prior to its introduction to pH cell 41, the gas can be passed from conduit 34 through valve 42, conduit 43 and conduit 39 directly into pH cell 41. Water used from the slurry in cell 41 to saturate the gas can be replenished by distilled water admitted to cell 41 via conduit 44. Electrodes 45 and 46 are connected by leads 47 and 48 to recorder-controller 49. The recorder-controller 49 combines apparatus for measuring the E.M.F. of the pH cell 41 and translating the E.M.F. measured, into carbon dioxide content which is recorded, and apparatus for varying the pressure on pneumatic air line 51 in response to the signal generated by the cell 41. When a reading below a certain preset pH value is sensed by recorder-controller 49, the change in pressure on pneumatic air line 51 actuates alarm 52 so as to inform operating personnel and at the same time rotates three-way valve 30 to closed system position, as shown, closes valve 53 in conduit 54 so as to interrupt the flow of ethylene to drier surge tank 55, and opens valve 56 in line 57 so as to supply ethylene to drier 32. The effluent from scrubber 23 containing off-specification ethylene is passed via conduit 29, valve 30, and conduit 58 to conduit 22 and is thus returned to scrubber 23.

When the cause of off-specification ethylene being passed through scrubber 23 has been corrected and pH cell 41 indicates that the carbon dioxide content of conduit 29 is again within the prescribed limits, recorder-controller 49 rotates valve 30 to open position so that ethylene passes via conduit 31 to drier 32 instead of via conduits 58 and 22 to scrubber 23. Valve 53 is caused to open and valve 56 is caused to close.

Figure 2:
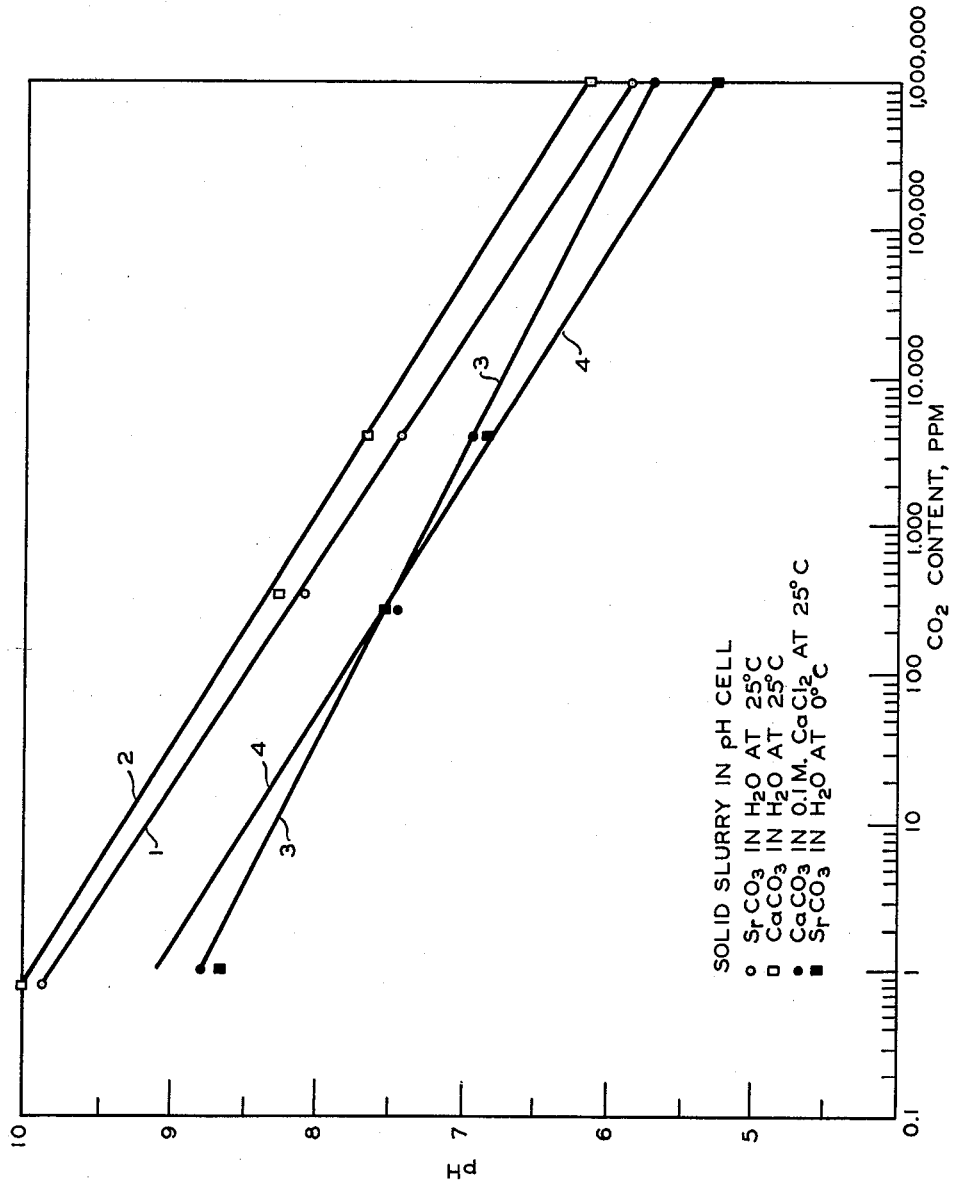
FIGURE 2 is a family of curves illustrating the relationship between pH and carbon dioxide content of various alkaline earth carbonate-water slurries.

The family of curves shown in FIGURE 2 were obtained using an equilibrium pH cell substantially as shown at 41 in FIGURE 1 and a Beckman model H–2 line operated pH meter. The materials used as standards were (1) pure, cylinder $CO_2$ for one million parts per million $CO_2$; (2) cylinder ethylene containing 4000 p.p.m. $CO_2$ as determined by mass spectrometer; (3) fresh air samples containing 300 p.p.m. $CO_2$ as determined by infrared spectrometer and by chemical analysis and reported as being fairly constant at this value by numerous authorities; (4) and cylinder nitrogen containing 0.8 p.p.m. $CO_2$. The values obtained are shown in Table I below.

*Table I*

[Relationship of $CO_2$ and pH]

| Slurry | $SrCO_3$ | $CaCO_3$ | $CaCO_3$ | $SrCO_3$ |
|---|---|---|---|---|
| Solution | $H_2O$ | $H_2O$ | 0.1 M $CaCl_2$ | $H_2O$ |
| Temp., °C | 25 | 25 | 25 | 0 |
| | pH Values | | | |
| $CO_2$ (1,000,000 p.p.m.) | 5.82 | 6.11 | 5.70 | 5.27 |
| Ethylene (4,000 p.p.m.) | 7.42 | 7.63 | 6.90 | 6.82 |
| Air (300 p.p.m.) | 8.12 | 8.28 | 7.45 | 7.51 |
| Nitrogen (0.8 p.p.m.) | 9.85 | 9.96 | 8.76 | 8.62 |

In order to facilitate understanding of the invention a specific embodiment of the invention will be described; however, it is to be understood that the invention is not to be unduly limited thereby. As a specific example, the purification of an ethylene containing stream for use in a polymerization process for producing solid polyethylene will be considered. In the specific example under consideration the ethylene containing stream is processed in a system according to FIGURE 1 of the drawing.

The CO removal column 13 is operated as a flash tower. The feed enters the column at 0° F. at 390 p.s.i.a. and is flashed to 315 p.s.i.a. The bottoms temperature is −15° F.

The DMF scrubber 15 is operated at 300 p.s.i.a. with a feed temperature of 56° F.; bottom temperature of 38° F.; and top temperature of −20° F.

The pyrogallol scrubber 23 is operated at 550 p.s.i.a. and a temperature of 100° F.

The drier 32 is operated at 550 p.s.i.a. and an inlet temperature of 500° F.

The compositions of streams at various points of the process are shown in Table II wherein the stream numbers correspond to like numbers of FIGURE 1.

Table II
STREAM COMPOSITION OF PROCESS

| Stream No. | Composition, Lb./Stream Day | | | | | | | | |
|---|---|---|---|---|---|---|---|---|---|
| | 12 | 14 | 16 | 22 | 21 | 17 | 26 | 29 | 33 |
| Methane | 193 | 64 | 129 | 129 | 32 | | | 129 | 129 |
| Acetylene | 1,223 | | 1,223 | 1 | Tr | 1,534 | | 1 | 1 |
| Ethylene | 82,705 | 448 | 82,257 | 81,620 | 13,581 | 10,416 | | 81,620 | 81,620 |
| Ethane | 1,960 | | 1,960 | 1,960 | 327 | 238 | | 1,960 | 1,960 |
| CO | 5 | 5 | Tr | Tr | | | | (1 to 10 p.p.m.) | |
| $CO_2$ | 264 | | 264 | 264 | 44 | 44 | | (20 to 100 p.p.m.) | |
| $H_2O$ | | | | | | | 51,102 | 94 | |
| NaOH | | | | | | | 6,012 | | |
| Pyrogallol | | | | | | | 3,006 | | |
| DMF | | | | | 135,086 | 135,050 | | | |

The $CO_2$ content of conduit 29 is to be maintained below 50 p.p.m. Utilizing calcium carbonate in distilled water at 25° C. the pH will be maintained at a minimum of about 8.90, as shown by the chart of FIGURE 1.

So long as the pH measured by pH cell 41 is about 8.90 or higher, ethylene passes through conduit 29, valve 30, and conduit 31 to drier 32. Surge vessel 55 is maintained full of ethylene via valve 53 and conduit 54; valve 56 is closed.

In case the $CO_2$ content of the stream in conduit 29 increases to a value greater than about 50 p.p.m. as indicated by pH cell 41 registering a pH value below about 8.90, recorder controller 49 will change the pressure in pneumatic air line 51 so as to sound alarm 52; close valve 53; open valve 56; and rotate valve 30 so as to divert flow from conduit 31 to conduits 58 and 22. The ethylene flow will then be from surge vessel 55 via conduits 57 and 31 to drier 32 and the stream in conduit 29 will be recycled to pyrogallol scrubber 23.

An increase in $CO_2$ content in conduit 29 can be effected any of a number of causes; for example, an increase in the amount of $CO_2$ in the ethylene stream 12 will cause the caustic and pyrogallol solution to be exhausted at a more rapid rate than it is supplied via conduit 27.

When the cause of the increase in $CO_2$ content of the ethylene in conduit 29 has been determined and corrected and the cell 41 registers a pH of about 8.90 or above, recorder controller 49 will allow the air pressure in pneumatic air line 51 to return to normal thus closing valve 56; opening valve 53; and rotating valve 30 so as to divert flow from conduit 58 back to conduit 31.

The solution utilized in pyrogallol scrubber 23 is made up in the ratio of 300 lbs. of sodium hydroxide; 150 lbs. of pyrogallol; and 2,550 lbs. of water. In order to maintain the $CO_2$ content of the stream in conduit 29 at a value below 50 p.p.m. when treating an ethylene stream of the composition of conduit 12, about 3000 lbs. of fresh solution is added to scrubber 23 each stream day. Correspondingly about 3000 lbs. per stream day are drawn off via conduit 28.

Any known means for determining pH can be employed, however, an equilibrium cell is preferred. The electrodes in the equilibrium cell are not limited to the glass-calomel electrode system but any two electrodes which do not react with the alkaline earth carbonate slurry can be used.

Variations and modifications are possible within the scope of the disclosure of the present invention, the essence of which is the provision of a means and method for directly measuring the $CO_2$ content of a gaseous stream and recycling "off-specification" material while providing "on specification" material from storage.

That which is claimed is:

1. In a process for controlling the maximum allowable $CO_2$ content of a hydrocarbon stream wherein $CO_2$ is removed by absorption in aqueous NaOH solution in a contacting zone, the steps of passing a major stream of hydrocarbon effluent from said contacting zone to a product recovery zone; passing a minor stream of hydrocarbon effluent from said contacting zone through an aqueous slurry of alkaline earth carbonate; measuring the pH of said slurry; diverting the stream of hydrocarbon from the product recovery zone and returning said stream to said contacting zone when the pH of said slurry falls below a value indicating the presence of more than the maximum allowable $CO_2$ content of said stream; and resuming the passing of said major stream to said product recovery zone when the pH of said minor stream rises above said value.

2. In a process for purifying a hydrocarbon stream wherein $CO_2$ is removed in a $CO_2$ removal zone, the steps of passing a major stream of substantially $CO_2$-free hydrocarbon effluent from said removal zone to a product storage zone so as to maintain said storage zone filled; passing said major stream over that required to fill said storage zone to a product recovery zone; passing a minor stream of hydrocarbon effluent from said contacting zone through an aqueous slurry of alkaline earth carbonate; measuring the pH of said slurry; diverting the stream of hydrocarbon from the product recovery zone and storage zone and returning same to said contacting zone when the pH of said slurry falls below a value indicative of a contaminating amount of $CO_2$; passing hydrocarbon from said storage zone to said product recovery zone; and resuming the flow of said major stream to said storage zone and said product recovery zone and stopping flow of hydrocarbon from said storage zone to said product recovery zone when the pH of said slurry rises above said value.

3. A process for continuously removing carbon monoxide, carbon dioxide, acetylene, oxygen, and water from an ethylene-containing stream so as to provide a feed stream for a catalytic polymerization process which comprises the steps of flashing the stream to substantially remove carbon monoxide; contacting the flashed stream with a selective solvent in a first contacting step to substantially remove acetylene; contacting the substantially acetylene-free stream with sodium hydroxide-pyrogallol solution in a second contacting step to substantially remove oxygen and carbon dioxide; passing the effluent from the second contacting step to a storage zone so as to maintain said storage zone filled; passing the effluent over that required to fill said storage zone to a drying zone to remove water; passing the ethylene from the drying zone to said polymerization zone; withdrawing a sample of said effluent upstream from said storage zone and contacting same with an aqueous slurry of calcium carbonate; measuring the pH of said slurry; diverting the effluent from the storage zone and the drying zone when the pH of said slurry drops below a value within the range of about 6.11 and about 10 and returning the effluent to the second contacting step; and passing effluent from said storage zone to said drying zone.

4. For use in a system for purifying an ethylene stream for feed to a catalytic polymerization reactor, apparatus comprising contacting means for contacting said stream with a $CO_2$ absorbent to remove $CO_2$ from said stream; ethylene surge storage means; means for passing effluent from said contacting means to said storage means and from said contacting means to a catalytic polymerization reactor; an equilibrium cell containing a glass electrode and a calomel electrode in the upper portion of said cell and a perforated disc positioned in the lower portion of said cell, said cell being substantially filled with an aqueous alkaline earth carbonate slurry; means for obtaining a sample stream of said effluent upstream from said storage means and passing same to said cell at a point below said perforated disc; and means actuated by said cell to divert flow of effluent passing to said storage and to said polymerization reactor and to return same to said contacting means and to pass stored effluent from said storage to said polymerization reactor when the pH of said slurry falls below a value indicating the presence of a contaminating amount of $CO_2$ in the contacting means effluent.

5. For use in purifying a hydrocarbon stream to obtain a $CO_2$-free product apparatus comprising contacting means to contact said stream with a $CO_2$ absorbent so as to remove $CO_2$ from said stream; $CO_2$-free hydrocarbon surge storage means; conduit for recovering $CO_2$-free hydrocarbon product means for passing effluent from said contacting means to said surge storage means and from said contacting means to said conduit for recovering product; pH determining means comprising an equilibrium cell containing an aqueous calcium carbonate slurry; means for obtaining a sample stream of said effluent upstream from said surge storage means and passing same to said pH determining means; and means actuated by said pH determining means to divert flow of effluent passing to said surge storage and to return same to said $CO_2$ removing means and to pass stored effluent from said surge storage to said conduit for recovering product when the pH of said slurry falls below a value indicating the presence of a contaminating amount of $CO_2$ in said effluent.

6. In a process for removing $CO_2$ from an ethylene-containing stream so as to provide a feed stream containing not more than about 50 parts per million of $CO_2$ for a catalytic polymerization process wherein the ethylene-containing stream is contacted with a sodium hydroxide-pyrogallol solution in a contacting zone to remove substantially oxygen and $CO_2$ from said stream, the improvement which comprises passing the effluent from said contacting zone to a storage zone so as to maintain said storage zone filled; passing said effluent over that required to fill said storage zone to a drying zone to remove water, passing the ethylene-containing stream from the drying zone to a polymerization zone, withdrawing a sample of said effluent and contacting same with an aqueous slurry of an alkaline earth carbonate; determining the pH of said slurry; diverting the effluent from the storage zone and the drying zone when the pH of said slurry is below about 8.90 and returning said effluent to said contacting zone; passing a stream from said storage zone to said drying zone and to said polymerization zone; and resuming the passing of the effluent from the contacting zone to the storage zone, the drying zone and the polymerization zone and terminating passing of the stream from the storage zone to the drying zone when the pH of the slurry is above about 8.90.

References Cited in the file of this patent

UNITED STATES PATENTS

| | | |
|---|---|---|
| 1,560,660 | Cain | Nov. 10, 1925 |
| 2,146,448 | Scott et al. | Feb. 7, 1939 |
| 2,171,809 | Spence | Sept. 5, 1939 |
| 2,351,167 | Ware | June 13, 1944 |
| 2,500,353 | Gantt | Mar. 14, 1950 |
| 2,775,637 | Lanning | Dec. 25, 1956 |
| 2,835,715 | Tiede | May 20, 1958 |

FOREIGN PATENTS

| | | |
|---|---|---|
| 387,911 | Germany | Jan. 5, 1924 |

OTHER REFERENCES

Lunge: "Technical Gas Analysis," pp. 122–124, D. Van Nostrand (1914).

Daniels: Outlines of Physical Chemistry, Wiley & Sons, New York (1948), pp. 457–468.